United States Patent Office  3,308,208  
Patented Mar. 7, 1967

3,308,208
POLYFLUORINATED PHOSPHATE ESTERS
Christian A. Seil, Santa Monica, Robert H. Boschan, Los Angeles, and James P. Holder, Woodland Hills, Calif., assignors to Douglas Aircraft Company, Inc., Santa Monica, Calif., a corporation of California
No Drawing. Filed May 4, 1964, Ser. No. 364,755
20 Claims. (Cl. 260—955)

This invention relates to certain polyfluoroalkyl phosphate esters, and is particularly concerned with the provision of novel bis (polyfluoroalkyl) aryl phosphates.

It is an object of the present invention to provide a series of compounds having high fire resistance, high temperature stability, and which remain in liquid form over a wide temperature range and are relatively non-volatile at elevated temperatures.

Another object of the invention is the provision of polyfluorinated phosphate esters having the above-noted properties and other advantages, and having particular utility as hydraulic fluids, heat transfer fluids, and as lubricants.

Other objects and advantages will appear hereinafter.

We have discovered that the above-noted objects are achieved according to the invention by the provision of a class of bis(polyfluoroalkyl) monoaryl phosphates having the formula (I) 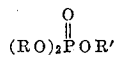

where R is a polyfluorinated alkyl group which can be either a straight chain or branched chain alkyl, preferably the former, containing from 2 to 12 carbon atoms, the number one carbon atom of said alkyl groups connected to the oxygen atom of the phosphate being free of fluorine substituents, and at least one of the carbon atoms of the alkyl groups commencing with the carbon atom in 2- position to the carbon atom connected to said oxygen atom is not fully fluorinated, and said last-mentioned carbon atom in 1- position is connected to only one carbon atom; and R' is aryl, e.g., phenyl, naphthyl, phenanthryl, and including substituted aryl such as tolyl, xylyl, biphenylyl, chlorophenyl, methyl naphthyl, and the like. Preferably, R' is phenyl.

The preferred bis(polyfluoroalkyl) monoaryl phosphate esters of the invention have the formula (II) 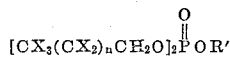

where X is a member selected from the group consisting of hydrogen and fluorine, R' is aryl, preferably phenyl, and $n$ is an integer of from 0 to 10, there being at least 2 fluorine atoms in each alkyl group, and in which at least one of the X substituents on at least one of the carbon atoms commencing with the carbon atom in the 2- position is hydrogen. Preferably, the major portion of the X substituents are fluorine.

The most desirable class of compounds, according to the invention, are those which have the formula (III) 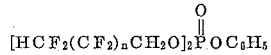

where $n$ has the values noted above.

In preferred practice, the value $n$ noted above ranges from about 2 to about 6, and in certain preferred phosphates is about 3. Also, preferably the compounds defined in the formulae noted above contain at least one fluorine atom on each of the carbon atoms beginning with the carbon atom in the 3- position of the alkyl group from its attachment to the adjacent oxygen atom. Usually, the carbon atoms of the alkyl groups beginning with the carbon atom in the 3- position and progressing to the carbon atom in the penultimate position of the alkyl group are fully fluorinated, that is, each such carbon atom has two fluorine atoms attached thereto. The last carbon atom of the alkyl groups can be partially or fully fluorinated, e.g., it may have from 1 to 3 fluorine substituents thereon, preferably at least 2 fluorine atoms. When the last carbon atom of the alkyl group is fully fluorinated, at least one of the other carbon atoms of the alkyl group commencing with the carbon atom in 2- position, and preferably the latter carbon atom, is not fully fluorinated. The carbon atom in the 1- position attached to the oxygen atom is free of fluorine atoms. In the most desirable class of compounds represented by Formula III above, the presence of only fluorine atoms on the carbon atom in 2- position (the beta carbon atom) renders these compounds particularly thermally resistant.

The combined fluorine content of the polyfluorinated phosphate esters of the invention can range from about 10% to about 65%, preferably about 30% to about 65%, by weight. In the compounds noted above, the two alkyl groups of the bis(polyfluoroalkyl) aryl phosphate esters hereof can be the same or different.

It has been found that the above-defined bis(polyfluoroalkyl) aryl, preferably phenyl, phosphates are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, generally these fluorinated phosphate esters have a thermal stability in the range of about 400 to about 700° F., autoignition temperatures up to and in excess of 1,000° F., and remain liquid down to a temperature of the order of −20 to −65° F. Further, the viscosity of such fluoroalkyl monoaryl phosphate esters at low temperatures of the order of −20 to −65° F. permit the operative use of such liquids as hydraulic fluids, cooling media and lubricants in these low temperature ranges. These compounds are also relatively non-volatile at elevated temperatures due to the high boiling point of these materials. Also, the phosphate esters of the invention have relatively low pour points, e.g., in the range of about −20° F. to about −75° F., or lower, which, together with the relatively low viscosity of these materials at low temperatures permits the liquid compounds to be pumped without high expenditure of energy at low temperatures. Moreover, the phosphate esters of the invention have good hydrolytic stability, and do not adversely affect materials, such as metals, e.g., steel, copper, and the like, with which they may be in contact. These improved properties are believed to be due to the presence of the combination of the class of polyfluoroalkyl radicals noted above, and the aryl radical in the phosphate esters of the invention.

The above-noted properties render the phosphate esters hereof particularly useful as hydraulic fluids, lubricants and cooling fluids in aircraft systems, especially modern high-speed aircraft systems.

The bis(polyfluorinated alkyl) aryl, preferably phenyl, phosphate esters of the invention are produced according to one convenient mode of procedure by reacting the corresponding polyfluorinated alcohol with an aryl phosphoryl dichloride, preferably phenyl phosphoryl dichloride, in a proportion of about 2 moles of the alcohol to one mole of the phosphoryl dichloride, preferably in the presence of pyridine or any other suitable HCl acceptor. The proportion of HCl acceptor or pyridine generally employed is usually about equimolar with respect to the polyfluorinated alcohol. The mixture is then heated at reflux for a period of hours, e.g., about 6 to about 12 hours, and is then cooled and a relatively large volume of water added. The mixture separates into a lower organic phase and an aqueous phase, and the organic phase containing the polyfluorinated phosphate ester is withdrawn. The aqueous layer is extracted with a solvent such as ether to remove organic values and the ether extract is added to the main organic layer withdrawn. The remaining organic reaction mixture is washed and then dried with a drying agent such as anhydrous magnesium sulfate. Unreacted polyfluorinated alcohol and solvents are removed by distilling at low pressure, and the remaining mixture is distilled at reduced pressure to recover the desired bis(polyfluoroalkyl) aryl, preferably phenyl, phosphate compounds.

Specific examples of bis(polyfluoroalkyl) aryl phosphates of the invention are as follows:

(1) $(HCF_2CH_2O)_2\overset{O}{\overset{\|}{P}}OC_6H_5$ (2) $(HCF_2CF_2CH_2O)_2\overset{O}{\overset{\|}{P}}OC_6H_5$ (3) $(CH_2FCF_2CF_2CH_2O)_2\overset{O}{\overset{\|}{P}}OC_6H_5$ (4) $(HCF_2CF_2CF_2CH_2O)_2\overset{O}{\overset{\|}{P}}OC_6H_5$ (5) $(CF_3CF_2CF_2CH_2CH_2O)_2\overset{O}{\overset{\|}{P}}OC_6H_5$ (6) $(HCF_2CF_2CF_2CF_2CH_2O)_2\overset{O}{\overset{\|}{P}}OC_6H_5$ (7) $[CF_3(CF_2)_3CHFCH_2O]_2\overset{O}{\overset{\|}{P}}OC_6H_5$ (8) $[HCF_2(CF_2)_5CH_2O]_2\overset{O}{\overset{\|}{P}}OC_6H_5$ (8a) $(CF_3CF_2CF_2CH_2CH_2CH_2O)_2\overset{O}{\overset{\|}{P}}OC_6H_5$ (9) $[CF_3(CF_2)_5CHFCH_2O]_2\overset{O}{\overset{\|}{P}}OC_6H_5$

(10) $[HCF_2(CF_2)_7CH_2O]_2\overset{O}{\overset{\|}{P}}OC_6H_5$

(11) $[HCF_2(CF_2)_7CH_2CH_2O]_2\overset{O}{\overset{\|}{P}}OC_6H_5$

(12) $[HCF_2(CF_2)_9CH_2O]_2\overset{O}{\overset{\|}{P}}OC_6H_5$

(13) $[HCF_2(CF_2)_9CH_2CH_2O]_2\overset{O}{\overset{\|}{P}}OC_6H_5$

(14) $(CF_3CF_2CF_2CH_2CH_2O)_2\overset{O}{\overset{\|}{P}}OC_{10}H_7$

(15) $(HCF_2CF_2CF_2CF_2CH_2O)_2\overset{O}{\overset{\|}{P}}OC_6H_4-CH_3$

(16) $(CF_3CF_2CF_2CH_2CH_2O)_2\overset{O}{\overset{\|}{P}}OC_6H_4-C_6H_5$

Two preferred compounds of the invention are compounds (5) and (6) above, these compounds being, respectively, bis-(3,3,4,4,5,5,5 - heptafluorophenyl)phenyl phosphate and bis-(1,1,5-trihydroperfluorophenyl)phenyl phosphate.

As noted above, the bis(polyfluoroalkyl) aryl phosphates hereof are produced from the corresponding polyfluorinated alcohols. A particularly useful starting material for producing another preferred bis(polyfluoroalkyl) phenyl phosphate product is the telomer fluoroalcohol mixture containing substantial amounts of each of the odd number polyfluoro telomer alcohols from the $C_3$ to the $C_{11}$ alcohols. These alcohols have the general formula $H(CF_2-CF_2)_{n_1}CH_2OH$, where $n_1$ is an integer of from 1 to 5.

The $C_3$ alcohols of this mixture contain about 37% by weight fluorine and the $C_{11}$ alcohols of the mixture about 63% by weight of fluorine. The use of such telomer alcohol mixture is economical, since the cost of such mixture is substantially less than the cost of the individual pure polyfluorinated alcohols, and the resulting phosphate product is highly suitable as a hydraulic fluid, heat transfer medium and lubricant.

The respective phosphate ester compounds in the mixture of phosphate esters produced employing the above-noted fluoroalcohols telomer mixture have the following formula:

(IV) 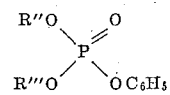

where $R''$ and $R'''$ are each $H(CF_2CF_2)_{n_1}CH_2-$ and where $n_1$ has the values defined above. $R''$ and $R'''$ in the above-noted formula can be the same or different. In the mixture of phosphates obtained employing the above-noted mixture of telomer fluoroalcohols containing the odd numbered $C_3$ to $C_{11}$ alcohols, $R''$ and $R'''$ will includes $C_3$, $C_5$, $C_7$, $C_9$ and $C_{11}$ alkyl chains.

The following are examples of preparation of the compounds of the invention:

*Example 1.—Bis(3,3,4,4,5,5,5-heptafluoropentyl) phenyl phosphate*

To a mixture of 107 g. (0.500 mole) of 3,3,4,4,5,5,5-heptafluoropentanol, 44 g. (0.56 mole) of pyridine and 100 ml. of benzene were added dropwise with stirring 52.7 g. (0.250 mole) of redistilled phenyl phosphoryl dichloride. The temperature was maintained below 29° C. during the addition, which required one hour. The mixture was stirred one hour at room temperature, then was heated to reflux temperature and refluxed overnight. The mixture was then cooled and poured into 400 ml. of water. The bottom organic layer was withdrawn and the aqueous layer was extracted with two 100 ml. portions of ether. The ether extracts were then added to the organic layer, which was then washed with two 100 ml. portions of 5% hydrochloric acid, 100 ml. of 5% sodium bicarbonate, and 100 ml. of water. Sodium chloride was added to break emulsions formed during the bicarbonate and water washes; 200 ml. of ether also were added during the final water wash. After drying over anhydrous magnesium sulfate, the solvents were removed by lowering the pressure with a water aspirator while heating.

The residue was distilled at lower pressure; the main phosphate ester fraction, 124.7 g. (88.0% yield), distilled at 107°–114° C. (0.080–0.095 mm. mercury pressure).

Analysis.—Calculated for $C_{16}H_{13}F_{14}O_4P$: C, 33.94; H, 2.31; P, 5.47. Found: C, 33.86; H, 2.40; P, 5.59.

The bis(polyfluoropentyl) phenyl phosphate ester thus produced, Compound 5 above, has a viscosity at 210° F. of 2.0 centistokes and a viscosity at −35° F. of 4,590 centistokes. The compound has a pour point of −85 to −90° F., a density of 1.55 g./ml. at 77° F., a thermal stability in the range of about 400° F. to about 500° F., an autoignition temperature of about 1100° F., and has good hydrolytic stability and high fire resistance. Such compound can be employed as a hydraulic fluid in the hydraulic systems of aircraft.

*Example 2.—Bis(1,1,5-trihydroperfluoropentyl) phenyl phosphate*

To a mixture of 232 g. (1.00 mole) of 1,1,5-trihydroperfluoropentanol, 87 g. (1.10 mole) of pyridine, and 200 ml. of benzene were added dropwise with stirring 105.5 g. (0.500 mole) of redistilled phenyl phosphoryl dichloride. The temperature was maintained below 30° C. during the addition, which was complete in one hour and 50 minutes. The mixture was stirred for 40 minutes and then heated to reflux temperature and refluxed overnight.

The mixture was then cooled and 400 ml. of water were added. The bottom organic layer was withdrawn and the aqueous layer was extracted with two 100 ml. portions of ether. The ether extracts were added to the organic layer, which was then washed with two 100 ml. portions of 5% hydrochloric acid and one 100 ml. portion of 5% sodium bicarbonate; sodium chloride was used to break emulsions formed during these washes. After drying over anhydrous magnesium sulfate, the solvents and remaining alcohol were evaporated by lowering the pressure with a water aspirator while heating.

The residue was distilled at lower pressure; the main product fraction, 278.1 g. (92.4% yield), distilled at 123°–130° C. (0.08–0.12 mm. mercury pressure).

The bis(polyfluoropentyl) phenyl phosphate ester thus produced, Compound 6 above, has a kinematic viscosity at 210° F. of 2.98 centistokes and 4,650 centistokes at −30° F. Such compound has a pour point of −75° F., a density at 77° F. of 1.64 g./ml., a thermal stability in the range of about 650° F. to about 750° F., and an autoignition temperature of about 1,010° F. Such compound has good hydrolytic stability and high fire resistance.

It is seen from the properties noted above that the bis (polyfluoroalkyl) phenyl phosphate ester of this example is an excellent functional fluid, particularly useful as a base stock for hydraulic fluids of an aircraft system operating over a wide temperature range of from about −400° to about 600° F.

*Example 3.—Mixed telomer polyfluoroalcohol phenyl phosphate*

To 500 g. (1.805 moles) of mixed telomer fluoroalcohols containing the $C_3$, $C_5$, $C_7$, $C_9$ and $C_{11}$ polyfluoroalcohols as noted above, 154 g. (1.947 moles) of pyridine, and 300 ml. of benzene were added dropwise with stirring 186.7 g. (0.885 mole) of redistilled phenyl phosphoryl dichloride. The temperature was maintained at 19°–25° C. during the addition, which was complete in 2¼ hours. The mixture was then heated to reflux temperature and refluxed overnight. The mixture was then cooled and 600 ml. of cold water were added. The organic layer was withdrawn and the aqueous layer was extracted with four 150 ml. portions of ether; these ether extracts were then added to the organic layer, which was then washed with two 150 ml. portions of 5% hydrochloric acid and one 1500 ml. portion of 5% sodium bicarbonate. After drying over anhydrous magnesium sulfate, the solvents were removed by lowering the pressure with a water aspirator. Unreacted alcohols were removed by distillation down to 0.55 mm. mercury pressure. The residue was then distilled at reduced pressure. The main phosphate ester fraction, 195.6 g., distilled at 148°–163° C. (0.35–0.41 mm.).

The product had an acid number of 6.90. 176.3 g. of the distillate were dissolved in 250 ml. of ether; the solution was neutralized with 10% sodium carbonate and dried over anhydrous magnesium sulfate. The solvent was removed by lowering the pressure with a water aspirator, the residue was distilled at lower pressure. The main product fraction, 112.3 g., distilled at 140°–170° C. (0.48–0.5 mm.), acid number 0.03.

The resulting bis(polyfluoroalkyl) phenyl phosphate ester mixture, containing compounds having the general Formula IV noted above, and including Compounds 2, 6, 8, 10 and 12 above, has satisfactory viscosity at low temperatures, low pour point, and a thermal stability of about 600° F. to about 700° F. Such phosphate ester mixture has a high autoignition temperature, good hydrolytic stability, and high fire resistance.

*Example 4.—Bis (4,4,5,5,6,6,6-heptafluorohexyl) phenyl phosphate*

To a mixture of 57.0 g. (0.25 mole) of 4,4,5,5,6,6,6-heptafluoro-1-hexanol, 218 g. (0.275 mole) of pyridine and 100 ml. of benzene were added dropwise with stirring 26.4 g. (0.125 mole) of re-distilled phenyl phosphoryl dichloride. The temperature was maintained at 14°–20° C. during the addition, which was complete in 1 hour. The mixture was heated to reflux temperature and refluxed overnight. The mixture was then cooled and poured into 200 ml. of water. The bottom fluoroalkyl phenyl phosphate layer and the benzene layer were withdrawn, and the aqueous layer was extracted with three 50 ml. portions of benzene, then with three 50 ml. portions of ether. The ether and benzene extracts were added to the combined fluoroalkyl phenyl phosphate and benzene layers, which were then washed with 50 ml. of 5% hydrochloric acid, 50 ml. of 5% sodium bicarbonate, and one 100 ml. portion of water and two 50 ml. portions of water. After drying over anhydrous magnesium sulfate, the solvents were removed by evaporation at room temperature.

The residue was distilled at lower pressure; the main phosphate ester fraction, 44.0 g. (59.2% yield), distilled at 138°–141° C. (0.30–0.32 mm. mercury).

*Analysis.*—Calculated for $C_{18}H_{17}F_{14}O_4P$: C, 36.38; H, 2.88; F, 44.76. Found: C, 36.43; H, 2.78; F, 44.37.

The bis(polyfluorohexyl) phenyl phosphate thus produced Compound 8a above, has a viscosity at 210° F. of 2.46 centistokes, a pour point of −55° F., and a density at 77° F. of 1.47 g./ml. The compound has high thermal stability, good hydrolytic stability and high fire resistance. Such phosphate ester can serve as a hydraulic fluid of an aircraft system.

*Example 5*

Compounds 1, 3, 4, 7, 9, 11 and 13 to 16 are prepared by procedure similar to that described above in Examples 1 and 2, except employing in each instance the appropriate corresponding fluorinated alcohol.

The resulting bis(polyfluoroalkyl) aryl phosphate esters thus obtained have properties generally similar to those of Compounds 5 and 6.

Applicants are aware of U.S. Patent 2,754,316, assigned to the same assignee as the instant application. This patent describes monoaryl di-fluoroalkyl phosphates in which all of the carbon atoms of the alkyl chains commencing with the carbon atom in 2- position from the oxygen of the phosphate radical, are fully fluorinated, that is, comprise $CF_2$ and $CF_3$ groups, as contrasted to the bis(polyfluoroalkyl) aryl phosphate esters of the present invention defined above and wherein at least one of the carbon atoms of the alkyl groups or chains commencing with the carbon atom in such 2- position is not fully fluorinated, and wherein said at least one carbon atom can be unfluorinated, as for example, the carbon atom in 2- position in the alkyl groups of Compounds 5, 11 and 13 above. Although the phosphates described in the above patent are valuable for use as hydraulic fluids, heat transfer media and the like, the compounds of the instant invention have certain advantages over the different compounds of the above patent. Thus, for example, invention compounds or liquids such as (5) and (6) above are stable when in contact with water at temperatures of the order of about 210° F. over extended time periods, e.g., in excess of 24 hours, with no deposits forming in such liquids, whereas under the same conditions with certain of the compounds of the above patent solids are formed. Further, the fluorinated alcohols used in preparing many of the phosphates of the invention are more readily available and considerably less expensive than the fluorinated alcohols required to prepare certain of the phosphates of the patent.

From the foregoing, it is seen that the invention provides a novel class of bis(polyfluoroalkyl) aryl phosphates which are designed particularly for use as base stocks of hydraulic fluids in aircraft systems, and which are also useful as lubricants and as heat transfer or cooling media in aircraft systems.

While we have described particular embodiments of our invention for the purpose of illustration, it should be

We claim:
1. A phosphate having the formula

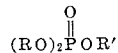

where R is a polyfluorinated alkyl group containing from 2 to 12 carbon atoms, the number one carbon atom of said alkyl groups connected to the oxygen atom of the phosphate being free of fluorine substituents, and at least one of the carbon atoms of the alkyl groups commencing with the carbon atom in 2- position to the carbon atom connected to said oxygen atom is not fully fluorinated, and said last mentioned carbon atom in 1- position is connected to only one carbon atom; and R' is aryl.

2. A compound as defined in claim 1, wherein R' is phenyl.

3. A bis(polyfluoroalkyl) aryl phosphate having the formula

where X is a member selected from the group consisting of hydrogen and fluorine, R' is aryl, and $n$ is an integer of from 0 to 10, there being at least 2 fluorine atoms in each alkyl group, and in which at least one of the X substituents on at least one of the carbon atoms commencing with the carbon atom in the 2- position is hydrogen.

4. A compound as defined in claim 3, wherein $n$ is an integer of from 2 to 6.

5. A bis(polyfluoroalkyl) phenyl phosphate having the formula

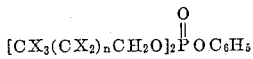

where X is a member selected from the group consisting of hydrogen and fluorine, and $n$ is an integer of from 0 to 10, there being at least 2 fluorine atoms in each alkyl group, and in which at least one of the X substituents on at least one of the carbon atoms commencing with the carbon atom in the 2- position is hydrogen.

6. A compound as defined in claim 5, wherein $n$ is an integer of from 2 to 6.

7. A compound as defined in claim 5, wherein $n$ is 3.

8. A compound as defined in claim 5, wherein said phosphate contains from about 10% to about 65% by weight of combined fluorine.

9. A compound as defined in claim 5, wherein the major portion of said X substituents are fluorine.

10. A compound as defined in claim 5, wherein $n$ is an integer of from 2 to 6, and wherein the major portion of said X substituents are fluorine, said phosphate containing from about 30% to about 65% by weight of combined fluorine.

11. A bis(polyfluoroalkyl)phenyl phosphate having the formula

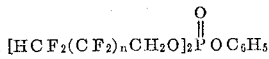

where $n$ is an integer of from 0 to 10.

12. A compound as defined in claim 11, wherein $n$ is an integer of from 2 to 6.

13. A mixture of phosphates having the formula

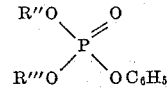

where R'' and R''' are each $H(CF_2CF_2)_{n_1}CH_2-$ where $n_1$ is an integer of from 1 to 5.

14. A mixture of phosphates as defined in claim 13, where said R'' and R''' include $C_3$, $C_5$, $C_7$, $C_9$ and $C_{11}$ alkyl chains.

15. The compound having the formula

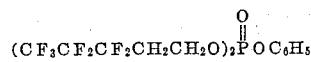

16. The compound having the formula

17. The compound having the formula

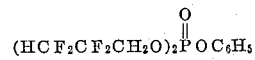

18. The compound having the formula

19. A bis(polyfluoroalkyl) phenyl phosphate having the formula

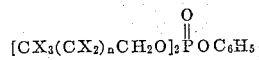

where X is a member selected from the group consisting of hydrogen and fluorine, and $n$ is an integer of from 0 to 10, there being at least 2 fluorine atoms in each alkyl group, and in which at least one of the X substituents on at least one of the carbon atoms in the 2, 3 and terminal positions is hydrogen.

20. A compound as defined in claim 19, wherein $n$ is an integer of from 2 to 6.

References Cited by the Examiner
UNITED STATES PATENTS

| | | | |
|---|---|---|---|
| 2,597,702 | 5/1952 | Benning | 260—955 |
| 2,727,058 | 12/1955 | Conly | 260—950 |
| 2,754,316 | 7/1956 | Conly | 260—955 |
| 2,885,377 | 5/1959 | Knowles et al. | 260—30.6 X |
| 2,955,985 | 10/1960 | Kuna | 167—93 X |

CHARLES B. PARKER, *Primary Examiner.*

BERNARD BILLIAN, FRANK M. SIKORA,
*Assistant Examiners.*